(12) United States Patent
Vanhatalo et al.

(10) Patent No.: US 11,617,380 B2
(45) Date of Patent: Apr. 4, 2023

(54) LIGNIN CONTAINING MICROCELLULOSE AS AN ANIMAL FEED ADDITIVE

(71) Applicant: Nordic Bioproducts Group Oy, Espoo (FI)

(72) Inventors: Kari Vanhatalo, Aalto (FI); Heikki Hannukainen, Aalto (FI); Asko Koskimäki, Aalto (FI); Olli Dahl, Aalto (FI)

(73) Assignee: Nordic Bioproducts Group Oy, Espoo (FI)

( * ) Notice: Subject to any disclaimer, the term of this patent is extended or adjusted under 35 U.S.C. 154(b) by 429 days.

(21) Appl. No.: 16/612,426

(22) PCT Filed: May 9, 2018

(86) PCT No.: PCT/FI2018/050352
§ 371 (c)(1),
(2) Date: Nov. 11, 2019

(87) PCT Pub. No.: WO2018/206852
PCT Pub. Date: Nov. 15, 2018

(65) Prior Publication Data
US 2020/0196632 A1    Jun. 25, 2020

(30) Foreign Application Priority Data
May 10, 2017 (FI) ..................... 20175420

(51) Int. Cl.
*A23K 20/163* (2016.01)
*A23K 50/75* (2016.01)
*A23K 10/30* (2016.01)

(52) U.S. Cl.
CPC ............ *A23K 20/163* (2016.05); *A23K 10/30* (2016.05); *A23K 50/75* (2016.05)

(58) Field of Classification Search
CPC ........ A23K 50/75; A23K 10/30; A23K 10/32; A23K 20/163; A23K 50/00; A23K 1/18; A23K 1/12; A23K 1/14; A23V 2002/00; A23V 2250/51084; A23V 2250/51088; A23L 33/24

See application file for complete search history.

(56) References Cited

U.S. PATENT DOCUMENTS

| | | |
|---|---|---|
| 2004/0047897 A1 | 3/2004 | Backers |
| 2013/0112193 A1 | 5/2013 | Karppi |
| 2013/0203981 A1 | 8/2013 | Dahl et al. |

FOREIGN PATENT DOCUMENTS

| | | |
|---|---|---|
| CN | 105076921 A | 11/2015 |
| FI | 126842 B | 6/2017 |
| JP | 2015509373 A | 3/2015 |
| JP | 2017002919 A | 1/2017 |
| JP | 2018110551 A | 7/2018 |
| WO | WO2011154599 A1 | 12/2011 |
| WO | WO2013132159 A1 | 9/2013 |
| WO | WO2014202711 A1 | 12/2014 |
| WO | WO2016159250 A1 | 10/2016 |
| WO | WO2017056275 A1 | 4/2017 |

OTHER PUBLICATIONS

Toda et al: Relationship among Sieber-, Chlorine, and Permanganate Numbers and Lignin Content of Unbleached Pulps. Research Laboratory of the Kokusaku Pulp Ind Co Ltd, Jul. 10, 1961, vol. 15, No. 7, pp. 442-449.

*Primary Examiner* — Hong T Yoo
(74) *Attorney, Agent, or Firm* — Laine IP Oy

(57) ABSTRACT

According to an example aspect of the present invention, there is provided an animal feed additive, which contains lignin-containing microcellulose, especially lignin-containing microcrystalline cellulose, for improving feed conversion rates of production animals, such as poultry.

15 Claims, 2 Drawing Sheets

LIGNIN CONTAINING MICROCELLULOSE AS AN ANIMAL FEED ADDITIVE

FIELD

The present invention relates to animal feed additives comprising lignin-containing microcellulose targeted for especially production animals. Such animal feed additives are designed for partly replacing basic animal diet, thereby providing cheaper animal feed products together with improved animal growth.

BACKGROUND

The research scientists of Aalto University have earlier developed a unique way to manufacture pure microcrystalline cellulose (MCC) fractions from the forest industry by-products, which putatively facilitates the applicability of these fractions as feed supplements for production animals (European patent EP 2 822 397). To shed light on the nutritional value of MCC in ruminants, scientists performed an in vitro rumen simulation in which the compound feed was partially replaced with two different cellulose fractions in low and high energy diets, respectively. MCC fractions had a significant dose-dependent suppressive effect on the rumen lactic acid formation, which had a direct effect on the rumen pH. This result suggested that the growth and fermentation activity of lactic acid-producing rumen bacteria was suppressed. Interestingly, the effect of cellulose fractions on the other fermentation parameters (for example VFA production and microbial biomass) was minimal.

Lactic acid bacteria are the dominating group of microorganisms in the broiler chicken small-intestine, where the majority of feed-derived energy is absorbed. It is noteworthy that small-intestinal bacteria compete directly with the host for specific nutrients. Hence, the inhibition of these bacterial populations may have a profound impact on nutrient capture by the host thus improving body weight gain and the feed conversion efficiency. The 'brown' MCC contains phenolic compounds, which are likely to possess antimicrobial properties. Therefore, it is possible that by including MCC in the diet, the small-intestinal microbial activity is reduced, which could have a beneficial effect on the broiler chicken performance.

Commercially available microcrystalline cellulose has been earlier utilized for animal feed supplements. One essential downside of such microcrystalline cellulose is its high price. Thus, there is a need for new means for utilizing microcellulose, especially lignin-containing microcrystalline cellulose within animal feed industry in a price-wise manner.

SUMMARY OF THE INVENTION

The invention is defined by the features of the independent claims. Some specific embodiments are defined in the dependent claims.

According to an aspect of the present invention, there is provided an animal feed additive comprising lignin-containing microcellulose.

According to another aspect of the present invention, there is provided an animal feed additive comprising lignin-containing microcrystalline cellulose.

According to a further aspect of the present invention, there is provided a method for producing an animal feed by partly replacing a basic animal diet with the animal feed additive according to the present invention.

This and other aspects, together with the advantages thereof over known solutions are achieved by the present invention, as hereinafter described and claimed.

The animal feed additive according to the present invention is mainly characterized by what is stated in claim 1.

The method for producing an animal feed according to the present invention is mainly characterized by what is stated in claim 10.

The use according to the present invention is characterized by what is stated in claim 16.

Considerable advantages are obtained by means of the invention. For example the microcellulose and/or microcrystalline cellulose utilized in the present invention has significantly lower production costs and carbon footprint than those of conventional microcellulose and/or microcrystalline cellulose. Lignin-containing microcellulose and/or microcrystalline cellulose can be easily produced from brown stock pulp and when the production is integrated to a pulp mill, the production of microcellulose and/or microcrystalline cellulose is feasible in bulk, which in turn leads to the price being competitive in animal feed production.

In addition, microcellulose and/or microcrystalline cellulose may serve as a potential fibre source for the beneficial caecal bacteria. Hence, the possible stimulation of lower intestinal bacterial fermentation may also have a profound impact on the animal performance.

Next, the present technology will be described more closely with reference to certain embodiments.

EMBODIMENTS

The present technology provides feed additives of lignin-containing microcellulose, which increase feed conversion rate (FCR) and body weight gain (BWG) of production animals. Such feed additives are easy and cheap to produce. The improved feed efficiency is a result of decreased feed intake and improved body weight gain as compared with control treatment.

Figure 1:
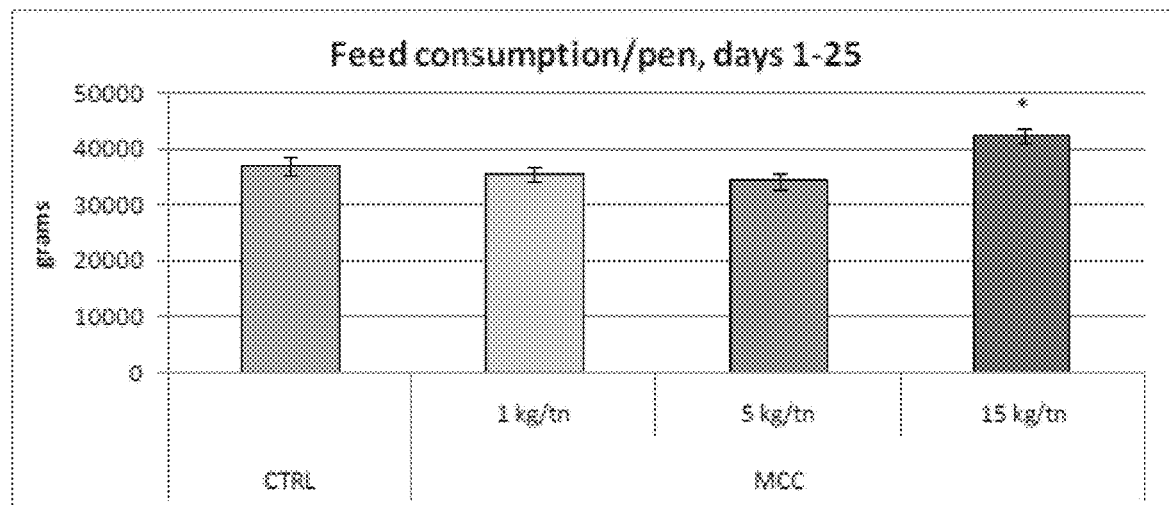
FIG. 1 is a diagram showing an average feed consumption per pen in different treatment groups during 25-day feeding trial.

The microcellulose used in the present invention can be manufactured according to any known process.

However, according to a preferred embodiment of the invention, the microcellulose is manufactured by a process described in Finnish patent FI 126842 B.

For example, in one embodiment, fibrous lignocellulosic material is subjected to acid hydrolysis at a temperature of at least 140° C. and at a consistency of at least 8%, calculated on the dry weight of the cellulose. When using a mineral acid, the acid is added (on a 100 wt-% basis), in an amount of about 0.2 to 2% on the dry weight of the cellulose. Typically, hydrolysis will be carried out a a pH in the range of about 1 to 6.5, in particular 2 to 6, More particularly, in a preferred embodiment, a fibrous cellulosic, lignin-containing material is subjected to mild acid hydrolysis at a temperature of at least 140° C., preferably between 140 and 185° C., more preferably between 150 and 180° C., most suitably between 155 and 175° C. In such an embodiment, the consistency is typically at least 8%, preferably from 8 to 50%, more preferably from 15 to 50%, even more preferably from 20 to 50%, and most suitably from 25 to 45%, based on the dry weight of the cellulose. The hydrolysis can be carried out by contacting the fibrous cellulosic material with the acid, preferably by mixing. A particular advantage of the embodiment resides in the finding that the lignin present in the starting material does not impair the production of the microcrystalline cellulose product.

The fibrous cellulosic material used as a starting material in the hydrolysis can be any cellulosic material containing lignin, such as a material based on softwood or hardwood, preferably a chemical pulp thereof, which material can be hydrolyzed under the above-mentioned conditions, and can contain other materials than cellulose and lignin, such as hemicellulose. Also non-wood lignocellulosic plant materials can be suitable, such as cotton, grass, bagasse, straws of grain crops, flax, hemp, sisal, abaca or bamboo.

According to one embodiment of the present invention, the used microcellulose is preferably in the form of "high-purity" microcellulose, i.e. microcellulose having high glucose content, particularly having glucose content of at least 97% by weight, and most suitably glucose content of at least 98% by weight.

According to another embodiment of the present invention, the microcellulose is in the form of "medium-purity" microcellulose, preferably being lignin-containing microcellulose having a glucose content of at least 70% by weight, preferably at least 80% by weight, and most suitably at least 90% by weight.

However, the microcellulose can be used in the feed additive in varying contents, depending on the energy requirement of the animal to be fed in the current stage of its development and growth.

As used herein, the term "microcellulose" is intended to include microcrystalline cellulose (MCC), powdered microcellulose, and hydrolyzed cellulose. The MCC is generally defined as microcellulose that has been purified, and partially de-polymerised from alpha-cellulose. The degree of polymerization is typically less than 400. Similarly, the powdered cellulose has generally been purified and disintegrated from alpha-cellulose. Further, the term "microcellulose" is intended to include lignin-containing microcellulose, which (as stated above) can have a lower glucose-content, but instead contain lignin. In this case, the microcellulose is manufactured (according to the herein described procedures) using lignin-containing cellulose as a raw-material.

According to one embodiment of the present invention, the average particle size of the microcellulose is preferably 8-100 µm, more preferably 10-60 µm, even more preferably 15-30 µm, and most suitably less than 20 µm.

According to one embodiment of the present invention, the lignin content in a cellulose raw-material is preferably up to 15%, more preferably up to 10%, and most suitably up to 5% by weight of the raw material, while the hemicellulose content preferably is less than 15%, more preferably less than 10% by weight.

According to one embodiment of the present invention, the lignin content of the microcrystalline cellulose used in the animal feed additive is up to 20%, preferably up to 15%, and most suitably up to 10% by weight of the microcrystalline cellulose.

Lignin content can be measured by kappa number, which is an indication of the residual lignin content or bleachability of wood pulp by an ISO-standardized analysis method. The kappa number estimates the amount of chemicals required during bleaching of wood pulp to obtain a pulp with a given degree of whiteness. Since the amount of bleach needed is related to the lignin content of the pulp, the kappa number can be used to monitor the effectiveness of the lignin-extraction phase of the pulping process. It is approximately proportional to the residual lignin content of the pulp.

In one embodiment of the present invention the kappa number of the raw material used for the production of MCC was up to about 80, from which the kappa number of the produced lignin-containing MCC was up to about 100.

Typically, lignin is removed from the lignocellulosic raw material because it causes problems in the microcellulose production. In the present invention, however, lignin does not have to be removed, because of the obtained advantages, such as energy increase of the feed additive, antimicrobial properties of the lignin and cost-savings otherwise caused by the removal steps. Addition of lignin afterwards the microcellulose production does not result similar advantageous effects. In a preferred embodiment, the present invention enables antimicrobial-free feeding, or at least essentially reduces the amount of antimicrobials in the animal feed.

As stated earlier, the animal feed additive is designed for partly replacing a basic animal diet. According to one embodiment of the present invention, it is preferred that the inclusion rate of the animal feed additive per basic animal diet is between 1 kg/tn and 15 kg/tn, preferably between 1 kg/tn and 5 kg/tn, and most suitably about 5 kg/tn on a dry matter basis.

The inventors of the present invention have discovered that the animal feed additive according to the present invention increases body weight gain of an animal at least 2%, preferably at least 7% during 25-day feeding trial, when compared to a control diet without the animal feed additive. The test animal in this particular feeding trial was chicken, but the animal feed additive as provided herein can also be applied for any other production animal.

Based on the experiments focusing on animal feed conversion rate and body weight gain, it can be concluded that it is advantageous to partly replace a basic animal diet by the animal feed additive according to the present invention. As stated earlier, inclusion rate of the animal additive per basic animal diet is preferably between 1 tn/kg and 15 tn/kg on a dry matter basis. A higher amount of additive was clearly seen as excessive wasting of the feed most likely due to decreased palatability of the diet. One type of suitable basic animal diet is soy-wheat based. However, other common animal diets may also be used.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

The present invention can be utilized in animal feed industry for increasing for example animal feed conversion rate and body weight gain, as well as animal performance by using animal feed additives, which contain lignin-containing microcellulose and/or lignin-containing microcrystalline cellulose. The animal feed additives according to the present invention are cheap to produce and provide improved feed efficiency.

EXAMPLES

Materials and Methods

Newly hatched chickens were divided in the groups of 15, see Table 1. In addition to the non-amended control, three MCC doses were tested. Each diet was fed to 8 pens. With this setup, the number of birds totaled to 480.

The applied diets were formulated and manufactured by MTT Agrifood Research Finland. The basic diet formula (starter; days 1-15 and grower; days 16-25) was wheat-soy based.

The treatment groups were as follows:
1. Control diet with no amendment (basic diet)
2. MCC, 1 kg/ton (basic diet replaced on a dry matter basis)
3. MCC, 5 kg/ton (basic diet replaced on a dry matter basis)
4. MCC, 15 kg/ton (basic diet replaced on a dry matter basis) The dry matter content of the MCC batch was ~40% at the time of the feed manufacturing.

TABLE 1

The feeding trial set-up.

| Treatment | Number of pens | Birds/pen | Birds/treatment |
|---|---|---|---|
| Control diet, No MCC | 8 | 15 | 120 |
| Control diet + MCC; dose 1 | 8 | 15 | 120 |
| Control diet + MCC; dose 2 | 8 | 15 | 120 |
| Control diet + MCC; dose 3 | 8 | 15 | 120 |

Feeding Trial and Sample Handling

Animals and housing.

The 25-day experiment was conducted in the broiler house of Alimetrics at Somero, southern Finland. On day 1, 480 newly-hatched, Ross 508 broiler chicks were allocated into 32 open pens of 0.75 m×1.5 m, with wood shavings litter, 15 birds per pen, 8 replicate pens per feeding treatment. There were 120 birds per treatment.

The temperature of the hall was initially raised to 30° C., and brooder lamps were adjusted to provide extra heating to the chicks during the first two weeks. The temperature was gradually decreased over the rearing period. Temperature in the pens was monitored with an automated recording system throughout the experiment. The light:dark cycle was 18 hours light and 6 hours dark per day, with gradually decreasing light intensity during the growth period. The air humidity was increased with a humidifier, and the humidity was also monitored and recoded on a daily basis. The chicks had free access to feed and water throughout the trial. There were two feeders per pen, and water came through nipple watering lines.

Performance Analyses.

The 480 hatchlings were individually weighed on day 1 prior to getting them to pens to eat and drink. All the chicks were again weighed individually on days 15 and 25 (slaughter). Feed given to the pens were weighed, and the leftovers were weighed on days 15 (starter diet) and 25 (grower diet). Thus, feed consumption, the feed conversion ratio (FCR, feed provided in each pen divided by the total body weight of birds in a pen) and bird body weight gain (BWG) were measured for days 1-15 and 15-25. Birds that were found dead in the pens, and birds euthanized by cervical dislocation because of leg problems, injuries, or other health problems, were weighed and recorded, and stored in freezer for possible necropsy.

Sampling.

Two chicks per pen were sacrificed on days 15 and 25, and their ileum and cecum was sampled. All 128 ileal and 128 caecal digesta samples were stored in freezer for possible later analysis of microbial parameters.

Statistical Analyses

Statistical analysis consisted of two-tailed t-tests for all measured parameters. The tests were performed against the treatment with no amendment just as Dunnett's post hoc test would have been used, but t-test was chosen to let the individual treatments be independent of the other treatments tested simultaneously.

Significance According to Student's t-Test:
p-value<0.01~
p-value<0.05*
p-value<0.01**
p-value<0.001***
p-value<0.0001****

Feed Consumption

FIG. 1 presents the average feed consumption of broiler chickens per pen at the end of 25-day feeding period. The highest (15 kg/tn) dose of MCC increased statistically significantly the feed consumption as compared to the control with no amendment (p<0.05). It is noteworthy however, that the increased feed consumption was due to the fact that the birds scattered and wasted the feed around the pen. This suggests that the feed was not palatable due to high MCC concentration. Due to the excessive feed wasting, the duration of the trial was shortened from 28 to 25 days. Similar increase of feed consumption or wasting was not observed with the low (1 kg/tn) and intermediate (5 kg/tn) doses of MCC. In fact, the feed intake tended to be lower especially with the 5 kg/tn MCC inclusion as compared to the control.

Body Weight Gain (BWG)

Figure 2:
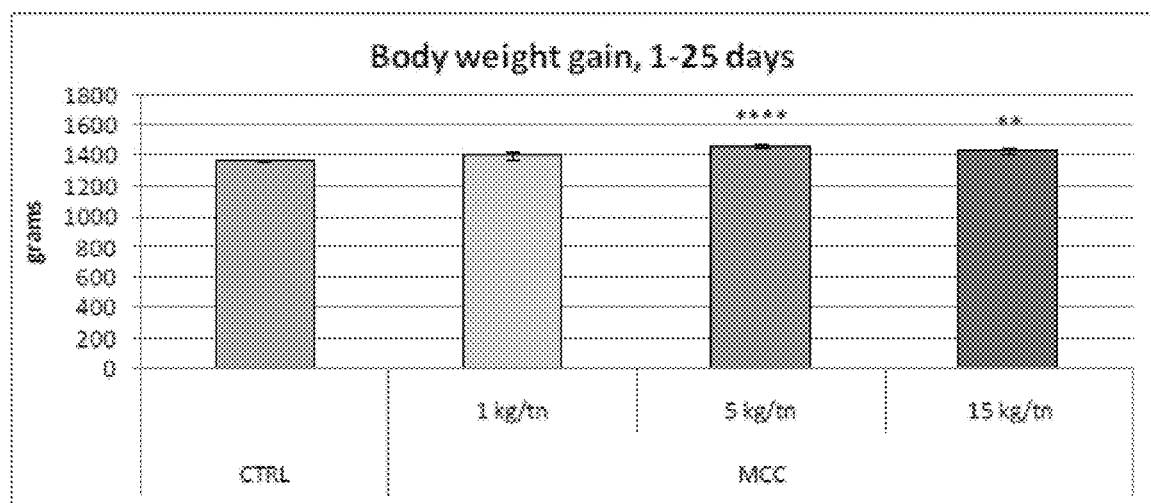
FIG. 2 is a diagram showing an average body weight gain of birds in different treatment groups after 25-day feeding trial.

BWG was monitored for individual animals at one intermediate time point (day 15) as well as in the end of the 25-day feeding period. The average BWG of the chickens in the control group was 1364 grams at the end of the trial. As illustrated in FIG. 2, the 5 g/tn inclusion of MCC increased the BWG significantly (approximately by 96 g per bird as compared to the control). This result was surprising, since the feed consumption tended to be lower with the 5 kg/tn MCC inclusion. In addition, the highest (15 kg/tn) MCC dose increased the BWG. However, the feed consumption was also increased as discussed above.

The patterns of the BWG at day 15 were similar to those of the day 25.

Feed Conversion Ratio (FCR)

FCR is a measure of an animal's efficiency in converting feed mass into body mass i.e. the amount of feed intake to make one kilogram of weight gain. Hence, the animals that have a low FCR are considered efficient users of feed.

Figure 3:
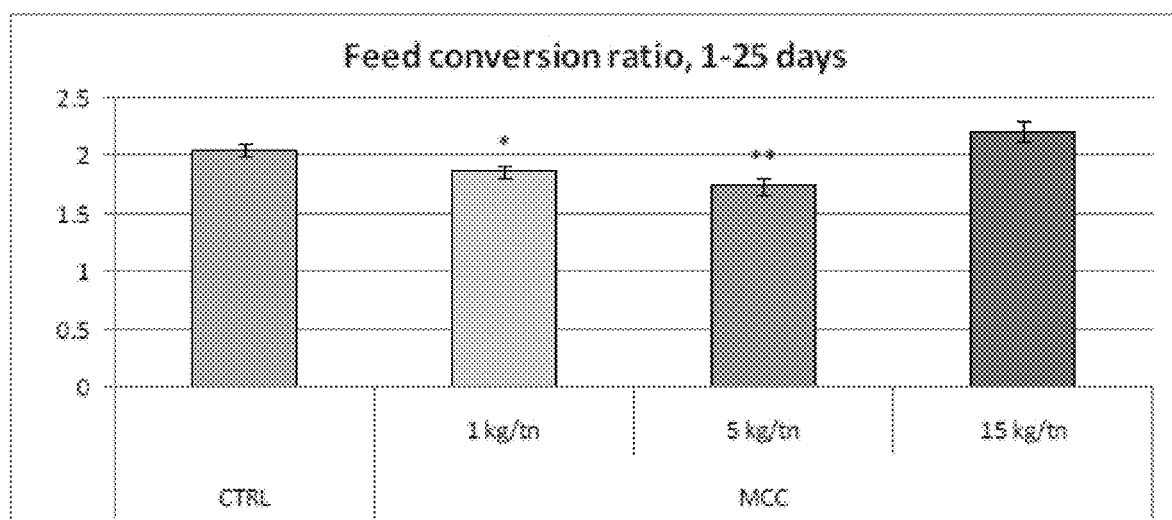
FIG. 3 is a diagram showing an average feed conversion rate of pens in different treatment groups after 25-day feeding trial.

The average FCR values of birds in different treatment groups after the 25-day feeding period are shown in FIG. 3. As expected according to the feed consumption and BWG results, the inclusion of MCC (1 or 5 kg/tn) in the diet improved significantly FCR of the broiler chickens. The most significant improvement was observed with the 5 kg/tn inclusion level ($p<0.01$). This result is indeed promising and suggests that MCC has a potential to be applied as a performance-enhancing feed additive. The highest MCC inclusion level did not show statistically significant differences to the control due to significantly increased feed consumption and wasting within this treatment group.

It is worth noting that the 5 kg/tn MCC inclusion dose showed even more significant ($p<0.001$) improvement of FCR during the starter diet period from day 1 to 15.

Mortality

The broiler chickens in the present trial did not show diarrhoea or other signs of diseases or digestive problems, so none of the chicks that died or were culled were sent to veterinary examination for infective diseases. A total of 18 birds died or were culled during the 25-day feeding period (mortality of 3.75%). None of the MCC treatments affected the mortality of the chicks in this trial.

CONCLUDING REMARKS

The aim of the present work was to discover whether MCC has an effect on the broiler chicken growth performance in an experimental feeding trial. In our previous rumen simulation study, MCC fractions had a significant dose-dependent suppressive effect on the rumen lactic acid formation without compromising the VFA production. This result suggested that the MCC inclusion inhibited specifically the growth and fermentation activity of lactic acid-producing rumen bacteria.

Lactic acid bacteria are known to be a dominating group of microorganisms in the broiler chicken small-intestine, where the majority of feed-derived energy is absorbed. It is also known that small-intestinal bacteria compete directly with the host for specific nutrients. Hence, this feeding trial aimed to evaluate whether similar specific inhibition of lactic bacteria due to MCC inclusion into the diet as in the rumen simulation would occur also in broiler chicken and more importantly, would such inhibition improve the animal performance parameters due to reduced competition of the feed-derived nutrients.

The present experiment suggested that especially 5 kg/tn of MCC improved significantly the BWG and FCR of Ross 508 broiler chickens during the entire 25-day trial period. The improved feed efficiency was as a result of decreased feed intake and improved weight gain as compared with the control treatment. The results of this study also showed that the highest (15 kg/tn) MCC inclusion rate was too high to be applied in broiler chicken feed. This was clearly seen as excessive wasting of the feed most likely due to decreased palatability of the diet.

The obtained results are indeed promising and support the abovementioned hypothesis of the reduced competition of the feed-derived nutrients in upper gastrointestinal tract. Another possibility for the improved performance could be that MCC may serve as a potential fiber source for the beneficial caecal bacteria. Hence, the possible stimulation of lower intestinal bacterial fermentation may also have a profound impact on the animal performance.

CITATION LIST

EP 2 822 397
FI 126842 B

The invention claimed is:

1. An animal feed which increases body weight gain and/or a feed conversion rate of an animal, the animal feed comprising an animal feed additive incorporated into the animal feed, wherein the animal feed additive comprises lignin-containing microcellulose having a glucose content of at least 70% by weight and a lignin content of from 5-20% by weight.

2. The animal feed of claim 1, wherein the glucose content is at least 80% by weight.

3. The animal feed of claim 1, wherein the animal feed comprises a poultry feed.

4. The animal feed of claim 1, wherein the animal feed additive is incorporated into the animal feed at an inclusion rate of between 1 kg/ton and 15 kg/ton on a dry matter basis.

5. The animal feed of claim 1, wherein the lignin-containing microcellulose comprises an average particle size of 8-100 µm.

6. The animal feed of claim 5, wherein the lignin-containing microcellulose comprises an average particle size of 10-60 µm.

7. The method of claim 1, wherein the lignin-containing microcellulose comprises lignin-containing microcrystalline cellulose.

8. The animal feed of claim 1, wherein the lignin content of from 6-20% by weight.

9. The animal feed of claim 1, wherein the lignin content of from 10-20% by weight.

10. A method for increasing body weight gain and/or a feed conversion rate of an animal, the method comprising:
administering to the animal an amount of the animal feed comprising the animal feed additive according to claim 1, wherein the animal feed additive is effective to increase the body weight gain and/or feed conversion rate of the animal relative to a same diet without the animal feed additive.

11. The method of claim 10, wherein the animal comprises poultry.

12. The method of claim 10, wherein the animal feed comprises a poultry feed.

13. The method of claim 10, wherein the animal feed additive is incorporated into the animal feed at an inclusion rate of between 1 kg/ton and 15 kg/ton.

14. The method of claim 10, wherein the animal feed is wheat-soy based.

15. The method of claim 10, wherein the administering is effective to increase the body weight gain of the animal by at least 2% relative to the same diet without the animal feed additive.

* * * * *